US012506515B2

(12) United States Patent
Demir et al.

(10) Patent No.: US 12,506,515 B2
(45) Date of Patent: Dec. 23, 2025

(54) ADAPTIVE BIASING PROCEDURE TO INCREASE AUXILIARY PA EFFICIENCY FOR AN INTEGRATED ECHO CANCELLER

(71) Applicant: ZEBRA TECHNOLOGIES CORPORATION, Lincolnshire, IL (US)

(72) Inventors: Alpaslan Demir, East Meadow, NY (US); Mark W. Duron, Mastic, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 91 days.

(21) Appl. No.: 18/618,738

(22) Filed: Mar. 27, 2024

(65) Prior Publication Data

US 2025/0226856 A1 Jul. 10, 2025

Related U.S. Application Data

(60) Provisional application No. 63/619,274, filed on Jan. 9, 2024.

(51) Int. Cl.
*H03F 1/32* (2006.01)
*G06K 7/00* (2006.01)
*H04B 7/015* (2006.01)

(52) U.S. Cl.
CPC .......... *H04B 7/015* (2013.01); *G06K 7/0008* (2013.01); *H03F 1/3235* (2013.01)

(58) Field of Classification Search
CPC .. G01S 7/02; G01S 7/35; G01S 15/10; G06K 7/00; G06K 7/10; G06K 7/0008; G06K 19/00; H01Q 1/22; H01Q 11/12; H03F 1/02; H03F 1/32; H03F 1/56; H03F 1/3235; H03F 3/04; H03F 3/19; H04B 1/04; H04B 1/40; H04B 3/23; H04B 7/015; H04B 15/00
USPC .......... 330/127, 297; 375/219, 285, 295, 316
See application file for complete search history.

(56) References Cited

U.S. PATENT DOCUMENTS

| | | | | |
|---|---|---|---|---|
| 10,515,240 | B1* | 12/2019 | Duron | G06K 7/10009 |
| 2007/0060075 | A1* | 3/2007 | Mikuteit | G06K 7/0008 |
| | | | | 343/726 |
| 2011/0148579 | A1* | 6/2011 | Strzelczyk | G06K 7/10217 |
| | | | | 340/10.1 |
| 2017/0244363 | A1* | 8/2017 | Whittaker | H03F 3/245 |
| 2018/0368065 | A1* | 12/2018 | Sarkas | H04W 52/0225 |

* cited by examiner

*Primary Examiner* — Shawkat M Ali

(57) ABSTRACT

Techniques for echo cancellation in an RFID reader include incorporating an auxiliary error power amplifier (auxiliary PA) into the RFID reader, and dynamically adjusting a bias setting of the auxiliary PA based on a power level of a reflection of a signal transmitted by the RFID reader ("echo signal") as measured at the RFID reader. When the measured echo signal power level is high, techniques herein set the auxiliary PA bias setting to a higher level to allow the auxiliary PA to account for the stronger echo signal. Inversely, when the measured echo signal power is low, techniques herein set the auxiliary PA bias setting to a lower level to reduce power consumption while the enabling the RFID reader to cancel echo phenomena and reliably detect signal responses from RFID tags in an environment.

16 Claims, 7 Drawing Sheets

ADAPTIVE BIASING PROCEDURE TO INCREASE AUXILIARY PA EFFICIENCY FOR AN INTEGRATED ECHO CANCELLER

CROSS-REFERENCE TO RELATED APPLICATIONS

This application claims priority to, and the benefit of the filing date of, U.S. Provisional Application No. 63/619,274, filed Jan. 9, 2024 and entitled "Adaptive Biasing Procedure to Increase Auxiliary PA Efficiency for an Integrated Echo Canceller," the entirety of which is hereby incorporated by reference herein.

FIELD OF THE DISCLOSURE

The present disclosure relates to Radio-Frequency Identification (RFID) systems, and more particularly to echo cancellation and power efficiency in an RFID reader.

BACKGROUND

Radio-Frequency Identification (RFID) systems use radio wave communications to identify and/or track RFID tags affixed to objects. More particularly, an antenna of an RFID reader (sometimes referred to as an "interrogator") transmits an interrogation signal that is received by an RFID tag within range of the reader. The RFID tag, after receiving the interrogation signal, uses an antenna therein to transmit a response signal, which contains information identifying the RFID tag and/or the object to which the RFID tag is affixed. Accordingly, the exchange of radio-frequency signals between the RFID reader and tag enable the RFID reader to detect and obtain information regarding various objects in an environment when respective RFID tags are affixed thereto. RFID systems can be implemented as, but are not limited to, inventory management and tracking systems in which an RFID reader is used to identify and track the locations of respective objects (e.g., products) in a manufacturing, shipping, storage and/or retail environment.

Signals from the RFID reader are output at an antenna port of the RFID reader at a desired power level (e.g., 30 decibel-milliwatts (dBm)). This output, however, creates an echo or "self-jamming" signal back to the RFID reader. If not mitigated, the echo signal at the RFID reader impedes the ability of the RFID reader to reliably detect responses from RFID tags.

SUMMARY

In some aspects, an echo cancellation assembly is provided. The echo cancellation assembly may include a transceiver, a power amplifier, one or more processors, and one or memories communicatively coupled to the one or more processors. The one or more memories store instructions that, when executed by the one or more processors, cause the assembly to (1) transmit, by the transceiver, an initial signal at a first power level and a first phase, (2) measure a second power level and a second phase of a reflected signal, (3) map the second power level to a bias setting of the power amplifier, (4) determine, by an echo cancellation algorithm, an error vector signal with a third power level and a third phase that is at least partially out of phase relative to the second phase of the reflected signal, and/or (5) drive the power amplifier at the bias setting to amplify the error vector signal and at least partially cancel the reflected signal.

In some aspects, the instructions, when executed by the one or more processors, further cause the echo cancellation assembly to, subsequent to driving the power amplifier at the bias setting, (6) measure a subsequent power level and a subsequent phase of a subsequent reflected signal, (7) determine, by the echo cancellation algorithm, a subsequent error vector signal with a subsequent power level and a subsequent phase that is at least partially out of phase with the subsequent phase of the reflected signal, (8) drive the power amplifier at the bias setting to amplify the subsequent error vector signal and at least partially cancel the subsequent reflected signal, and/or (9) iteratively repeat the above actions (6), (7), and (8) until a minimum error threshold corresponding to the subsequent error vector signal is satisfied or a timeout threshold is exceeded. Moreover, in some of these aspects, the bias setting of the power amplifier is maintained as a same bias setting throughout each of the above actions (6), (7), (8), and (9).

In some aspects, the power amplifier is an auxiliary power amplifier, and the assembly further comprises a primary power amplifier and an error vector modulator. In these embodiments, the instructions, when executed by the one or more processors, further cause the echo cancellation assembly to (6) determine, by the echo cancellation algorithm, at least one of an in-phase offset signal or a quadrature offset signal, and/or (7) cause, by the echo cancellation algorithm, the error vector modulator to output the error vector signal based on one or more of (i) an error reference signal sampled at an output of the primary power amplifier, (ii) the in-phase offset signal, or (iii) the quadrature offset signal.

In some aspects, the instructions, when executed by the one or more processors, further cause the echo cancellation assembly to determine, by the echo cancellation algorithm, the error vector signal by (6) determining that the third power level of the error vector signal generates a minimum power level of the reflected signal, and (7) identifying a convergence of the third power level of the error vector signal with the second power level of the reflected signal based on the minimum power level of the reflected signal.

In some aspects, the echo cancellation assembly further includes a bandpass filter and an estimator. The initial signal may include a pilot tone, and the reflected signal may include a reflection of the pilot tone. The instructions, when executed by the one or more processors, further cause the echo cancellation assembly to (6) filter, by the bandpass filter, the reflected signal to detect the pilot tone, (7) measure, by the estimator, a pilot power level and a pilot period of the pilot tone, (8) generate, by the estimator, an error input based on the pilot power level and the pilot period, and/or (9) determine, by the echo cancellation algorithm, the error vector signal based on the error input. Moreover, in some of these aspects, the estimator generates the error input based on (i) an in-phase signal, (ii) a quadrature signal, or (iii) a combination of the in-phase signal and the quadrature signal.

In some aspects, the echo cancellation assembly further includes an antenna module, and a circulator defining (i) a transmission signal path for the initial signal to reach the antenna module, and (ii) a reception signal path that transmits the reflected signal.

In some aspects, a method is provided. The method may include (1) transmitting, by a transceiver, an initial signal at a first power level and a first phase, (2) measuring a second power level and a second phase of a reflected signal, (3) mapping the second power level to a bias setting of a power amplifier, (4) determining, by an echo cancellation algorithm, an error vector signal with a third power level and a third phase that is at least partially out of phase relative to the second phase of the reflected signal, and/or (5) driving the power amplifier at the bias setting to amplify the error vector signal and at least partially cancel the reflected signal.

In some aspects, the method further includes, subsequent to driving the power amplifier at the bias setting, (6) measuring a subsequent power level and a subsequent phase of a subsequent reflected signal, (7) determining, by the echo cancellation algorithm, a subsequent error vector signal with a subsequent power level and a subsequent phase that is at least partially out of phase with the subsequent phase of the reflected signal, (8) driving the power amplifier at the bias setting to amplify the subsequent error vector signal and at least partially cancel the subsequent reflected signal, and/or (9) iteratively repeating the above actions (6), (7), and (8) until a minimum error threshold corresponding to the subsequent error vector signal is satisfied or a timeout threshold is exceeded. Moreover, in some of these aspects, the bias setting of the power amplifier is maintained as a same bias setting throughout each of the above actions (6), (7), (8), and (9).

In some aspects, the power amplifier is an auxiliary power amplifier, and the method further comprises (6) determining, by the echo cancellation algorithm, at least one of an in-phase offset signal or a quadrature offset signal, and/or (7) causing, by the echo cancellation algorithm, an error vector modulator to output the error vector signal based on one or more of (i) an error reference signal sampled at an output of a primary power amplifier, (ii) the in-phase offset signal, or (iii) the quadrature offset signal.

In some aspects, the method further includes determining, by the echo cancellation algorithm, the error vector signal by (6) determining that the third power level of the error vector signal generates a minimum power level of the reflected signal, and (7) identifying a convergence of the third power level of the error vector signal with the second power level of the reflected signal based on the minimum power level of the reflected signal.

In some aspects, the initial signal includes a pilot tone, the reflected signal includes a reflection of the pilot tone, and the method further comprises (6) filtering, by a bandpass filter, the reflected signal to detect the pilot tone, (7) measuring, by an estimator, a pilot power level and a pilot period of the pilot tone, (8) generating, by the estimator, an error input based on the pilot power level and the pilot period, and/or (9) determining, by the echo cancellation algorithm, the error vector signal based on the error input. Moreover, in some of these aspects, the estimator generates the error input based on (i) an in-phase signal, (ii) a quadrature signal, or (iii) a combination of the in-phase signal and the quadrature signal.

In some aspects, the method further includes defining, via a circulator, (i) a transmission signal path for the initial signal to reach an antenna module, and (ii) a reception signal path that transmits the reflected signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
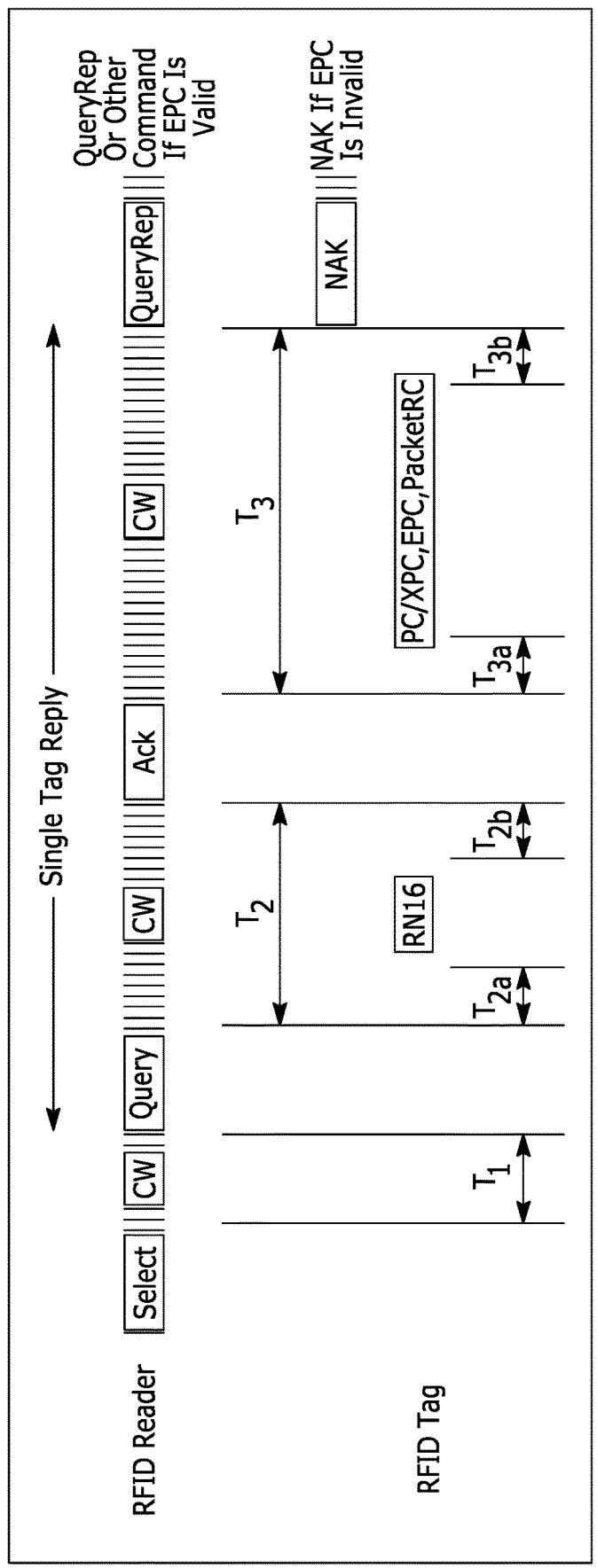
FIG. 1 depicts an example process of communications between a Radio-Frequency Identification (RFID) reader and RFID tag, in accordance with various embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, Radio-Frequency Identification systems are utilized in a variety of environments, for example to detect and/or track locations of objects in a manufacturing, shipping, storage, and/or retail environment. An RFID reader may be implemented as a battery powered handheld unit, and transmits an interrogation signal that is detected by an RFID tag affixed to an object (or by multiple RFID tags affixed to respective objects). The RFID tag responds to a received interrogation signal with a response signal that includes information identifying the RFID tag and/or the object to which the RFID tag is affixed. Thus, using the identifying information, the RFID reader (and/or another computing device communicatively connected thereto, e.g., an operator's smartphone) may obtain, manipulate and/or display information associated with detected RFID tags and objects in an environment.

To assist in demonstrating these use cases and the technical problems and solutions of the present disclosure, FIG. 1 depicts example transmission of signals between an RFID reader and RFID tag. The RFID reader uses a "Select" command to select a subpopulation of RFID tags for detection based on any desired criteria. After a minimum time period $T_1$ (e.g. 2 milliseconds(s)), the RFID reader transmits an interrogation signal (encoding a "Query") to which the nearby tags are to reply, and awaits a response from the RFID tag during a time period $T_2$. The RFID tag receives and is energized by the interrogation signal after the time period $T_{2a}$, and replies to the interrogation signal with a random or pseudo-random 16-bit number (RN16) by backscattering the interrogation signal. Any time the RFID reader is not encoding information (e.g., commands) in a transmitted signal, the RFID reader may transmit an unmodulated continuous waveform (CW). The encoded transmissions, by contrast, are generated by modulating the CW.

Upon receiving the RN16 reply after a time period $T_{2b}$, the RFID reader transmits another signal encoding an acknowledgement (ACK) of the RN16 by echoing the RN16. The RFID reader then awaits identifying information from the RFID tag during a time period $T_3$. The RFID tag receives the acknowledgment signal after a time period $T_{3a}$, and replies by transmitting another signal encoding the identifying information for the RFID tag ("identifying signal," e.g., encoding a protocol control or extended protocol control (PC/XPC), an electronic product code (EPC), and/or a cyclic-redundancy check code (PacketCRC)). The RFID reader receives the identifying signal after a time period $T_{3b}$. After receiving the identifying information, the RFID reader implements a QueryRep command or another command if the received identifying information (e.g., EPC) is valid, or a negative acknowledgment (NAK) if the identifying information is invalid.

The transmission of signals by the RFID reader (e.g., as described above) produces an output power that can be measured, for example, at a port of an antenna of the RFID reader. In practical use cases, this output power may, for example, be 30 dBm. When the RFID reader employs reasonably high output power (e.g., in the practical use cases described herein), the signal transmissions produce an echo signal that is received back at the RFID reader antenna (this signal is also referred to herein as a "self-jamming signal" or "reflected signal"). The echo signal, generally speaking, maintains the characteristics of the corresponding transmitted signal from RFID reader (e.g., wavelength, frequency, etc.). The power level of the echo signal can, for example, be approximately 20 dBm, in practical use cases. This echo power level is substantially greater than the power level of responses from RFID tags, which in practical use cases may be no higher than −30 dBm and possibly as low as −90 dBm (effectively, between $10^6$ and $10^{12}$ times weaker than the echo signal). Thus, the echo signal poses a risk of causing saturation of the input radio frequency (RF) front end of the RFID reader (e.g., the circuitry between the RFID antenna and mixer), and impedes the ability of the RFID reader to detect the comparatively weaker RFID tag responses amid the stronger echo power level.

The present disclosure considers echo cancellation solutions to prevent the input RF front end saturation, e.g., using an echo cancellation circuit that may for example be disposed between the antenna and an integrated circuit (IC) chip (e.g., ASIC) of the RFID reader. The echo cancellation circuit can be achieved using discrete parts, or alternatively, may be integrated in the RFID reader to reduce size and cost of the RFID reader while aiming to retain echo cancellation performance (e.g., adding the echo cancellation circuit to an IC of the RFID reader that already performs other functionalities). An integrated echo canceller (e.g., echo cancellation circuit) generates an error vector signal that is the same magnitude but out of phase with the echo signal (e.g., 180 degrees out of phase), such that the error vector signal cancels out the echo signal thereby producing echo cancellation.

The present disclosure also observes, however, that in an integrated silicon-based chip solution where a single IC performs both transmitting (Tx) and receiving (Rx) functionality of the RFID reader, the IC may be limited in the magnitude of an error vector signal that the IC can generate without comprising the phase rotation necessary to preserve echo cancellation. For example, the IC may only generate an error vector signal of a power level up to 10 dBm, which may be substantially less than the echo signal power level (e.g., 20 dBm).

Accordingly, the present disclosure proposes adding, to the RFID reader (e.g., in the IC), an auxiliary error power amplifier ("auxiliary PA" or simply "aux PA") to amplify the power level (and hence, magnitude) of the error vector signal to match that of the echo signal and thereby perform echo cancellation. Power output of the auxiliary PA is controlled by a bias setting of the auxiliary PA (e.g., a voltage bias or a current bias), where a higher bias setting accounts for higher magnitudes of the echo signal, but increases energy usage rate of the auxiliary PA. Thus, the present disclosure observes that, if the auxiliary PA is always biased based on the maximum expected echo signal power, the overall efficiency of the RFID reader suffers.

These problems pose a number of challenges to the practical use of RFID readers. For one, inefficient operation increases heat dissipation in the RFID reader, potentially damaging components thereof or making the RFID reader uncomfortable in the hand of a human user. Additionally, in use cases where the RFID reader is a battery powered handheld unit, reduced efficiency limits the single-charge lifetime of the RFID reader, thus either requiring a larger (and heavier) battery or reducing the length of time the RFID reader can be used in the environment without recharging.

In view of the problems above, the present disclosure proposes dynamically adjusting the bias setting of the auxiliary PA based on measurements of the power level of the echo signal at the RFID reader, to improve energy efficiency of the RFID reader. For example, when the measured echo signal power level is high, techniques herein set the auxiliary PA bias setting to a higher level to allow the auxiliary PA to account for the stronger echo signal. Inversely, when the measured echo signal power is low, techniques herein set the auxiliary PA bias setting to a lower level to reduce power consumption while the higher biasing is not needed. Further description and embodiments of these techniques will be provided with respect to subsequent figures.

Figure 2:
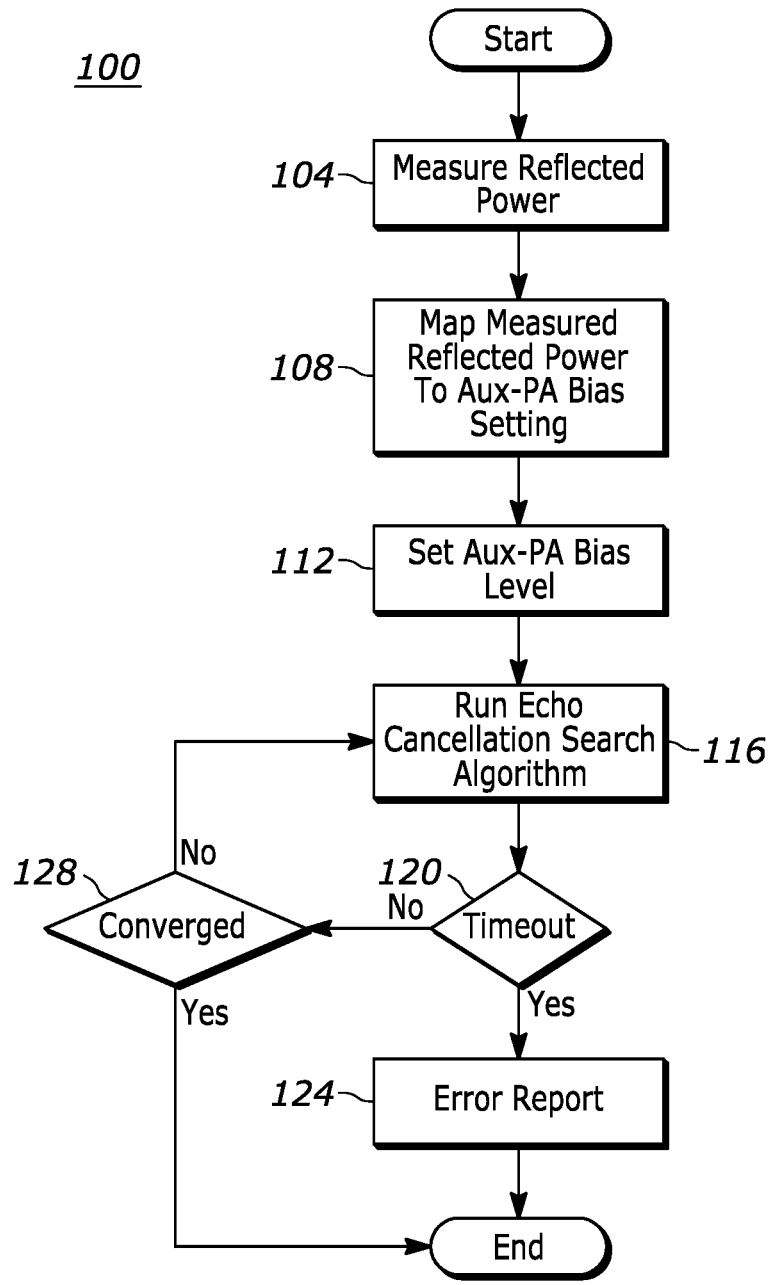
FIG. 2 depicts a flow diagram of example adaptive biasing techniques for an auxiliary error power amplifier, in accordance with various embodiments described herein.

Example Flow Diagram of Adaptive Biasing Techniques for Auxiliary Power Amplifier FIG. 2 depicts a diagram of an example flow 100 of adaptive biasing techniques for an auxiliary error power amplifier (Aux PA), in accordance with various embodiments described herein. More particularly, the flow diagram 100 involves echo cancellation algorithm training in the RFID reader, for example during time periods in which the RFID reader transmits the unmodulated CW (e.g., time periods $T_1$, $T_2$, and/or $T_3$ from FIG. 1).

Upon a triggering of the echo cancellation algorithm training ("Start") a power of a reflected echo signal ("reflected power") is measured (104), e.g., at the RFID reader antenna. The measured reflected power is then mapped to a required optimum bias setting for the auxiliary PA (108). The selected bias setting (i.e., the mapped bias setting from action 108) is applied to the auxiliary PA (112), and an echo cancellation search algorithm is run (116).

Generally, the search algorithm at action 116 runs until either one of a convergence or a timeout is reached. That is, upon the running of the search algorithm, it may be determined whether the timeout has been reached (120). If the timeout has been reached, the flow 100 proceeds to an action 124, where an error report is generated (128). The flow 100 in this case ends after the generation of the error report ("End").

If, alternatively, it is determined at action 120 that the timeout has not been reached, the flow 100 proceeds to an action 128, where it is determined whether a convergence has been reached between the echo signal and the error vector signal. Whether the convergence has been reached may be determined based on whether a difference between the echo signal and the error vector signal is at or below a threshold (or allowance), the value of which may be set based on design preference. If the convergence has been reached, the flow 100 ends. If the convergence has not been reached, the echo cancellation search algorithm continues operating (looping back to action 116).

In an example implementation of the looping echo cancellation search algorithm, the reflected power measurement from action 104 is mapped to an initial error vector magnitude. Candidate error vectors are defined at intervals over a 360 degree phase (e.g., 30 degree intervals) with magnitudes at intervals over and under the initial error vector magnitude (e.g., at intervals of 1 dBm over a range 2 dBm above and 2 dBm below the initial error vector magnitude). Respective echo signal power level measurements are performed for each candidate error vector, to identify a candidate error vector with the lowest echo signal power level (i.e., a candidate error vector that most effectively cancels out the echo phenomenon). If the candidate error vector produces an echo signal power level below a threshold, the flow 100 may conclude.

In another example implementation, the echo cancellation search algorithm includes a "finer" search, i.e., containing candidate error vectors more closely spaced around an initial error vector. For example, candidate error vector phases may be spaced at 5 degree intervals in a range 60 degrees above and below a phase of the initial error vector. Candidate error vector power levels may be spaces at 0.5 dBm intervals in a range 1 dBm above and below a power level of the initial error vector. Similarly to the comparatively "coarse" searching described previously, respective echo signal power level measurements are performed for each candidate error vector, to identify a candidate error vector with the lowest echo signal power level (i.e., a candidate error vector that most effectively cancels out the echo phenomenon). Additionally, if the candidate error vector produces an echo signal power level below a threshold, the flow 100 may conclude.

In some example implementations, the echo cancellation search algorithm combines "coarse" and "fine" searching techniques. For example, the echo cancellation search algorithm may perform a first "coarse" search to define an initial error vector, e.g., a particular error vector phase and power level to search more closely around in a second "fine" search to identify the error vector most effective in cancelling the echo signal. Still other possible implementations are possible. For example, where example candidate error vector search ranges/intervals are described above, other search ranges/intervals are possible based on design preference.

Example RFID Reader Architecture Using Initial Reverse Power Measurement

Figure 3:
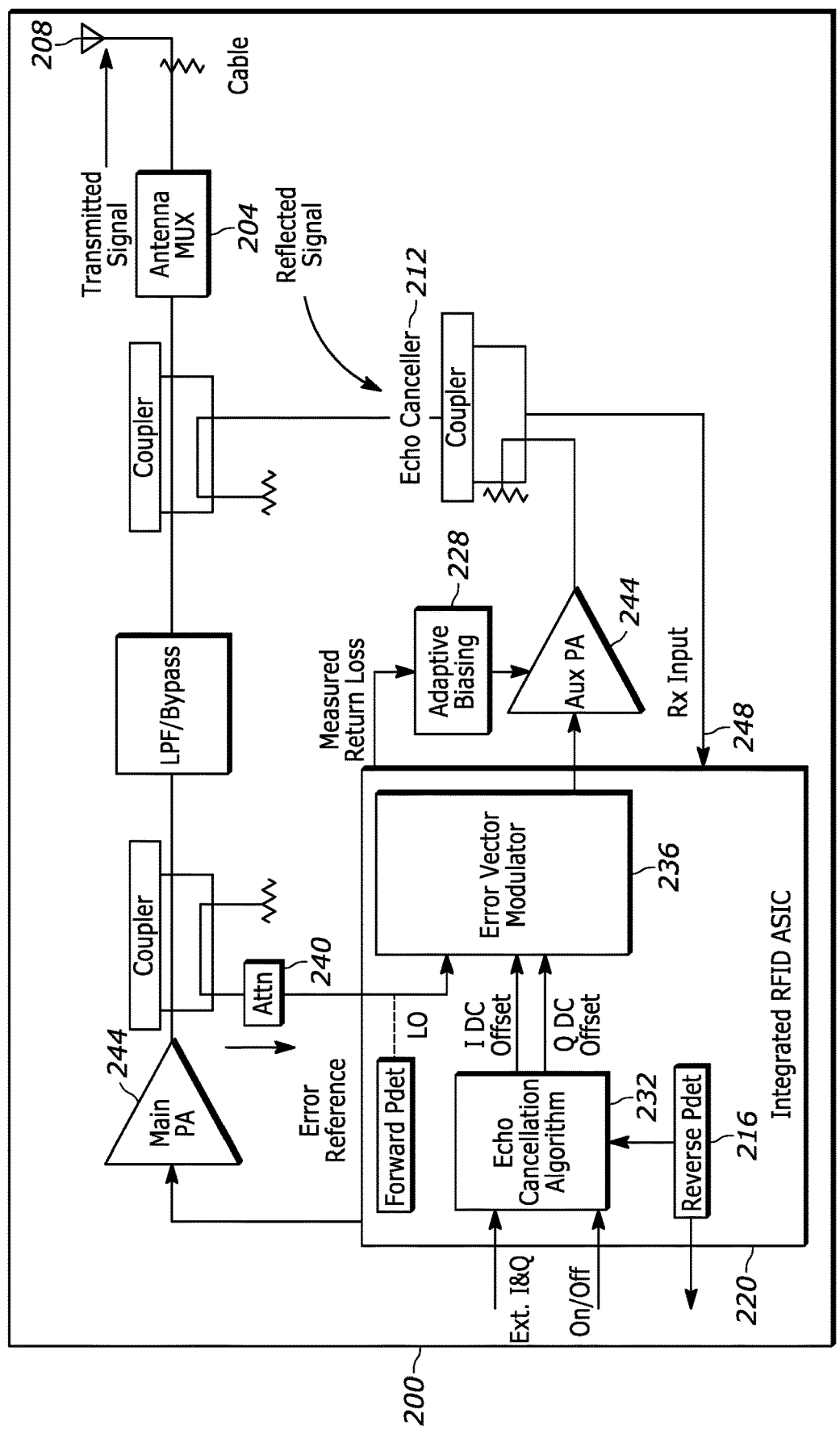
FIG. 3 depicts a block diagram of an example architecture of an RFID reader with adaptive biasing using an initial reverse power measurement, in accordance with various embodiments described herein.

FIG. 3 depicts a block diagram of a first example architecture of an RFID reader 200 that performs adaptive biasing of an auxiliary error power amplifier using an initial reverse power measurement, in accordance with some embodiments.

As depicted in FIG. 3, an antenna multiplexer (MUX) 204 provides a signal that is transmitted by an antenna 208 of the RFID reader 200, thereby producing a reflected signal (echo) proceeding along a cable to an echo cancellation circuit 212 ("echo canceller"). A reverse power detector 216 obtains an initial measurement of the "reverse power" of the echo signal. The reverse power detector 216 may, for example, be integrated in an integrated circuit (IC) 220 of the RFID reader 200 (e.g., an integrated RFID application-specific IC (ASIC)), and the measurement is mapped to a bias setting of an auxiliary error power amplifier ("auxiliary PA" or simply "aux PA") 224 which, via an adaptive biasing circuit 228, is biased at a required level to minimize power dissipation by the auxiliary PA 224.

Subsequently, the IC 220 runs an echo cancellation algorithm 232. An error vector modulator 236 receives, via an attenuator 240, a local oscillator (LO) signal as an error reference sampled at an output of a main power amplifier (PA) 244 of the RFID reader 200. The echo cancellation search algorithm 232 generates I and Q DC offsets (in-phase or cosine and quadrature or sine components, respectively) to generate a required error vector signal with the magnitude and phase required at the output of the auxiliary PA 224 such that the error vector signal will cancel the echo signal when combined at the echo canceller 212.

Effectively, the looping of the echo cancellation algorithm 232 (e.g., as described with respect to FIG. 2) converges to a solution such that the reverse power detector measurement reaches a minimum when the convergence is achieved. The reverse power detector 216 measures the minimum power for the settled solution of the echo cancellation algorithm 232. An error of the echo canceller 212 (e.g., difference between the echo signal and the error vector signal) is measured at an Rx input port 248 to the IC 220 and passed to the echo cancellation algorithm 232 for each iteration of the loop executing in the RFID reader 200 circuitry. The provided error from the Rx input port 248 drives execution of the echo cancellation algorithm 232 until timeout if the required minimum error level is not realized.

Example RFID Reader Architecture Using Pilot Tone

Figure 4:
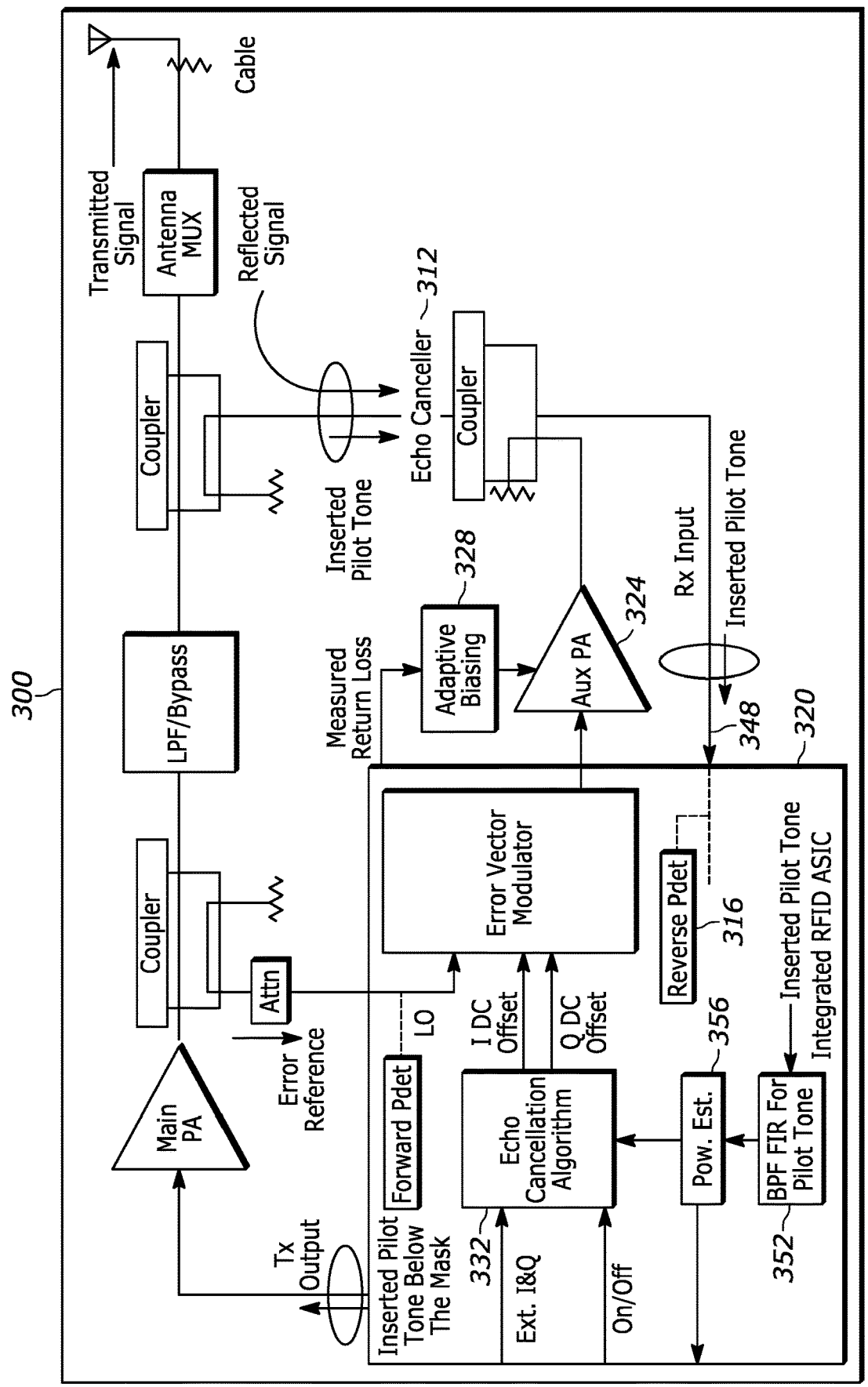
FIG. 4 depicts a block diagram of another example architecture of an RFID reader with adaptive biasing using a pilot tone, in accordance with various embodiments described herein.

FIG. 4 depicts a block diagram of another example architecture of an RFID reader 300 that performs adaptive biasing of an auxiliary error power amplifier using a pilot tone, in accordance with some embodiments. Where similar components to those described with regard to FIG. 3 are shown in FIG. 4, it should be understood that the components may operate in a similar manner as described with respect to FIG. 3, unless indicated otherwise herein.

As depicted in FIG. 4, the RFID reader inserts a pilot (test) tone into the transmitted signal (Tx waveform). The pilot tone has a power level, frequency, and phase offset to the modulated continuous waveform (CW) that is known at the RFID reader 300. Generally, the power level of the pilot tone may be set far below the power level of the CW, so as to not impede signal interpretation at RFID tags.

Similarly to as described with respect to FIG. 3, the transmitted signal is received back to the RFID reader 300 (and specifically, to an echo canceller 312) as the echo signal. In this case, though, the echo signal includes a reflection of the pilot tone (or simply "includes the pilot tone"). In turn, the pilot tone arrives to an IC 320 via an Rx input port 348.

Adaptive biasing for an auxiliary error power amplifier (aux PA) 324 via an adaptive biasing circuit 328 may be driven by a reverse power detector 316, and/or by a power measurement from a bandpass filter 352 ("BFR FIR for pilot tone"), by way of the error vector modulator (e.g., providing a signal(s) via an attenuator to the auxiliary PA 324. Particularly, in aspects, the input to the Rx input port 348 may be converted, filtered, digitized, and passed through the bandpass filter 352. The bandpass filter 352 selects for the pilot tone based on the known properties thereof, and ignores the other elements of the echo signal (e.g., the reflected continuous waveform). In other words, the bandpass filter 352 only allows the pilot tone to pass through, and rejects any other signal.

The IC 220 sets an initial auxiliary PA bias setting value for an echo cancellation algorithm 332 based on a determination of how much is reflected from the inserted pilot tone (e.g., the ratio of the pilot tone portion of the echo signal to the originally inserted pilot tone). In some possible aspects, the bias setting value is determined based on a linear combination of the power measurements from the reverse power detector 316 and the bandpass filter 352.

The techniques of FIG. 4 may involve full-duplex Tx/Rx base band processing by the RFID reader 300 during the echo cancellation algorithm training. That is, while the Tx baseband transmits the inserted pilot tone, the Rx baseband processes the pilot tone via the bandpass filter 352 and via a power estimator 356 to generate the input to the echo cancellation algorithm 332. In aspects, the pilot tone is only active during the echo cancellation algorithm training.

Example RFID Reader Architecture Using Circulator

Figure 5:
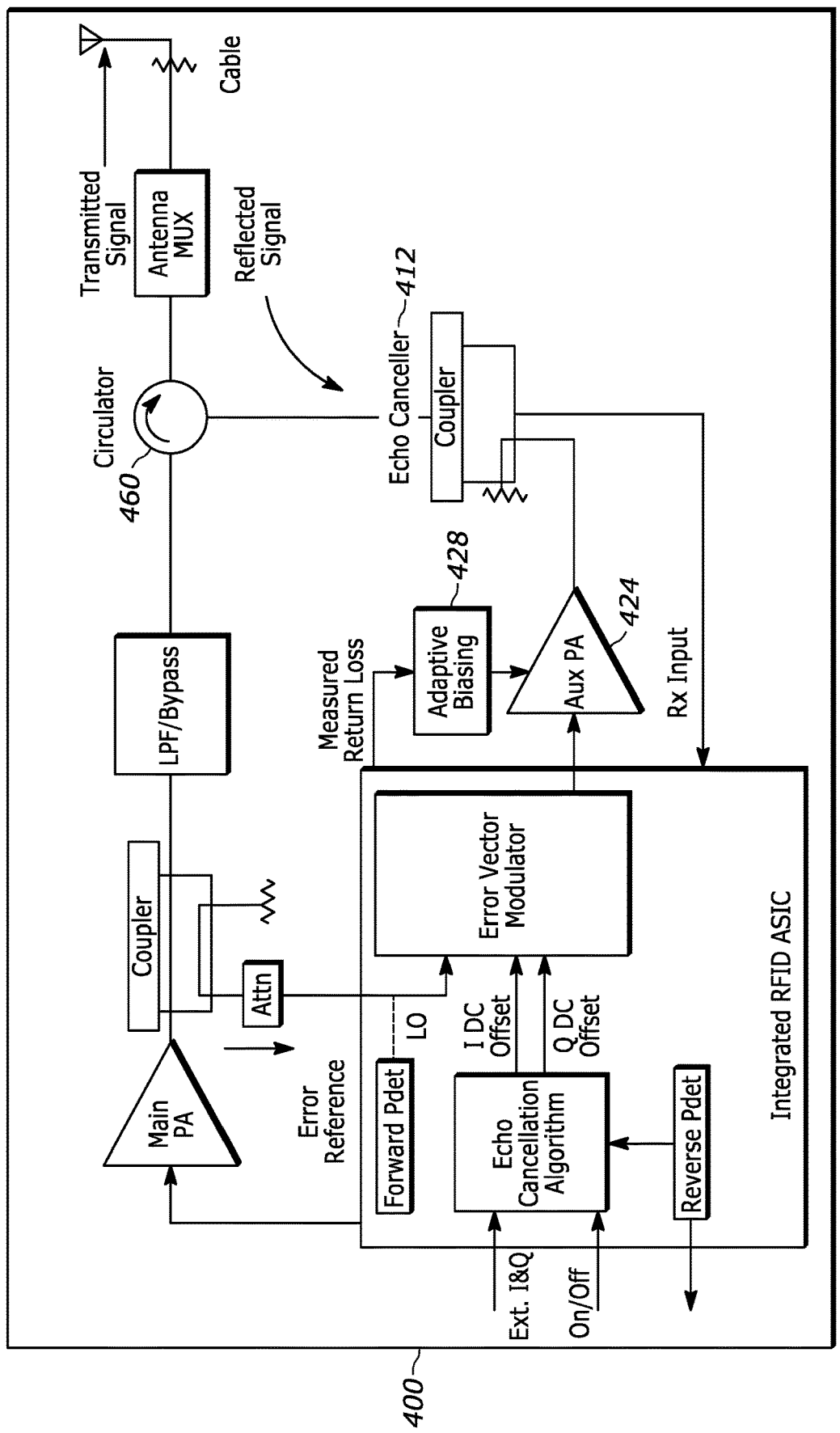
FIG. 5 depicts a block diagram of still another example architecture of an RFID reader with adaptive biasing using a circulator, in accordance with various embodiments described herein.

FIG. 5 depicts a block diagram of another example architecture of an RFID reader 400 that performs adaptive biasing of an auxiliary error power amplifier using a circulator, in accordance with some embodiments. Where similar components to those described with regard to FIGS. 3 and/or 4 are shown in FIG. 5, it should be understood that the components may operate in a similar manner as described with respect to FIGS. 3 and/or 4, unless indicated otherwise herein.

As depicted in FIG. 5, the RFID reader 400 includes an RF circulator 460, in place of a coupler as previously depicted in FIGS. 3 and 4. In these aspects, the power level of the echo signal may be substantially higher (e.g., several dBm higher) than the approaches of FIGS. 3 and 4 that used the coupler. The energy efficiency impact of adaptive biasing via an adaptive biasing circuit 428 becomes more pronounced in the case where an auxiliary error power amplifier 428 (auxiliary PA or aux PA) has a constant bias setting for the worst-case scenario (e.g., highest power level of the echo signal) while cancelling the highest echo signal power value. With a DC power level of the auxiliary PA 424 kept constant, an echo canceller 412 continuously dissipates a same DC power irrespective of the power level of the echo signal. In most practical scenarios, the power level of the echo signal need not be at the worst-case scenario, and thus, employing adaptive biasing significantly increases power efficiency for the auxiliary PA 424.

Example Environment Including Assembly and Receiver

Figure 6:
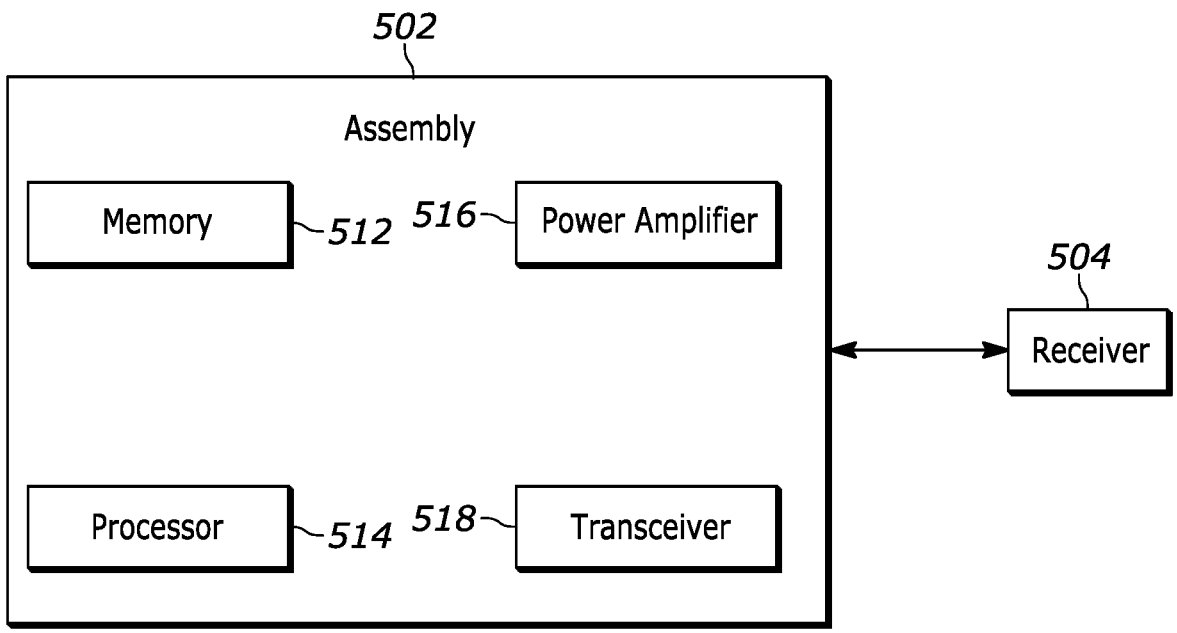
FIG. 6 depicts a block diagram of an example environment including an assembly and a receiver, in accordance with various embodiments described herein.

FIG. 6 depicts a block diagram of an example environment 500, components of which may be configured to implement adaptive biasing of an auxiliary power amplifier in accordance with techniques of this disclosure.

The environment 500 includes an assembly 502, which may for example be at least a portion of an RFID reader, e.g., as described with respect to FIGS. 1, 2, 3, 4, and/or 5. The environment 500 also includes a receiver 504 configured to receive signals transmitted by the assembly 502 via communications represented by the arrow connecting the assembly 502 and the receiver 504. The receiver 504 may, for example, be an RFID tag including an antenna connected to an integrated circuit. In some aspects, the receiver 504 may be an RFID tag including still additional components, e.g., a battery and/or one or more sensors. Although only one receiver 504 is depicted in FIG. 6, the environment 500 may include two, three, four or more receivers 504 (e.g., multiple RFID tags in the environment 500).

The assembly 502 includes a memory 512 (i.e., one or more memories, such as one or more non-transitory memories). The memory 512 stores instructions that, when executed by a processor 514 (i.e., one or more processors), cause the assembly 502 to perform actions attributed thereto (e.g., actions of one or more RFID readers described in this disclosure). The assembly 502 may further include any of the RFID reader circuitry and/or other components described with respect to FIGS. 3, 4, and/or 5. Transmission of signals between the transceiver 518 and an antenna of the receiver 504 may correspond to RFID communications between the assembly 502 and the receiver 504.

The environment 500 may include still additional and/or alternate components, in various possible aspects.

Example Method

Figure 7:
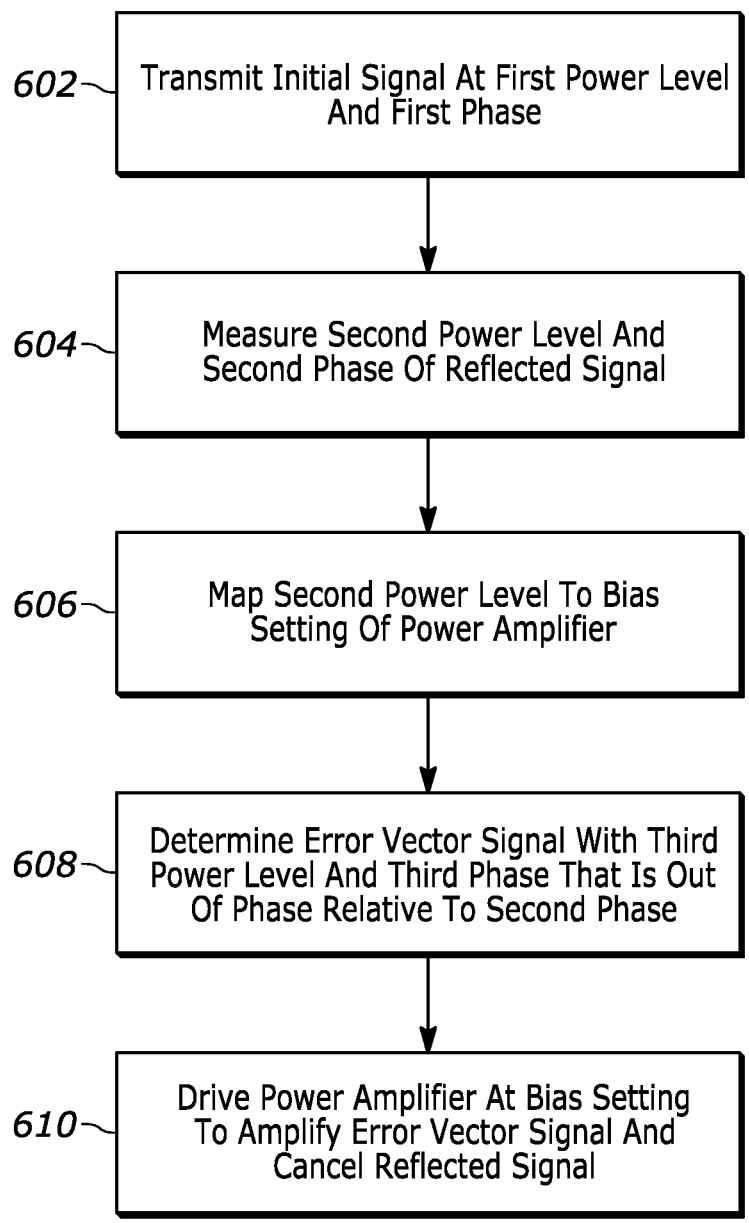
FIG. 7 depicts a block diagram of an example method, in accordance with various embodiments described herein.

FIG. 7 depicts a block diagram of an example method 600, in accordance with some embodiments of the present disclosure. Actions of the method 600 may be implemented, for example, by an assembly such as the RFID reader 200 of FIG. 3, the RFID reader 300 of FIG. 4, the RFID reader 400 of FIG. 5, and/or the assembly 502 of FIG. 6 (e.g., via one or more processors of the assembly executing instructions stored at one or more non-transitory memories of the assembly). Particularly, in some aspects, the method of FIG. 7 is implemented in an assembly (e.g., an RFID reader) via one or more processors executing instructions stored on one or more memories communicatively coupled to the one or more processors.

The method 600 includes transmitting, by a transceiver, an initial signal at a first power level and a first phase (602). The method 600 further includes measuring a second power level and a second phase of a reflected signal (604). The method 600 still further includes mapping the second power level to a bias setting of a power amplifier (606). The method 600 still yet further includes determining, by an echo cancellation algorithm, an error vector signal with a third power level and a third phase that is at least partially out of phase relative to the second phase of the reflected signal (608). Still additionally, the method 600 includes driving the power amplifier at the bias setting to amplify the error vector signal and at least partially cancel the reflected signal (610).

In some aspects, the method further includes, subsequent to driving the power amplifier at the bias setting, (1) measuring a subsequent power level and a subsequent phase of a subsequent reflected signal, (2) determining, by the echo cancellation algorithm, a subsequent error vector signal with a subsequent power level and a subsequent phase that is at least partially out of phase with the subsequent phase of the reflected signal, (3) driving the power amplifier at the bias setting to amplify the subsequent error vector signal and at least partially cancel the subsequent reflected signal, and/or (4) iteratively repeating the above actions (1), (2), and (3) until a minimum error threshold corresponding to the subsequent error vector signal is satisfied or a timeout threshold is exceeded. Moreover, in some of these aspects, the bias setting of the power amplifier is maintained as a same bias setting throughout each of the above actions (1), (2), (3), and (4).

In some aspects, the power amplifier is an auxiliary power amplifier, and the method further comprises (1) determining, by the echo cancellation algorithm, at least one of an in-phase offset signal or a quadrature offset signal, and/or (2) causing, by the echo cancellation algorithm, an error vector modulator to output the error vector signal based on one or more of (i) an error reference signal sampled at an output of a primary power amplifier, (ii) the in-phase offset signal, or (iii) the quadrature offset signal.

In some aspects, the method further includes determining, by the echo cancellation algorithm, the error vector signal by (1) determining that the third power level of the error vector signal generates a minimum power level of the reflected signal, and (2) identifying a convergence of the third power level of the error vector signal with the second power level of the reflected signal based on the minimum power level of the reflected signal.

In some aspects, the initial signal includes a pilot tone, the reflected signal includes a reflection of the pilot tone (e.g., sharing the same frequency, amplitude, and other signal characteristics of the pilot tone), and the method further comprises (1) filtering, by a bandpass filter, the reflected signal to detect the pilot tone, (2) measuring, by an estimator, a pilot power level and a pilot period of the pilot tone, (3) generating, by the estimator, an error input based on the pilot power level and the pilot period, and/or (4) determining, by the echo cancellation algorithm, the error vector signal based on the error input. Moreover, in some of these aspects, the estimator generates the error input based on (i) an in-phase signal, (ii) a quadrature signal, or (iii) a combination of the in-phase signal and the quadrature signal.

In some aspects, the method further includes defining, via a circulator, (i) a transmission signal path for the initial signal to reach an antenna module, and (ii) a reception signal path that transmits the reflected signal.

The method 600 may include still additional and/or alternate actions, including any suitable actions described in this disclosure, in various possible aspects. The method 600 may include fewer actions, in some possible aspects.

ADDITIONAL CONSIDERATIONS

Portions of the present disclosure describe RFID communication techniques most commonly associated with passive RFID tags, which traditionally do not have an internal power source and must be energized by the interrogation signal from an RFID reader to transmit signals back to the RFID reader. However, it should be appreciated that benefits attributed to techniques of this disclosure be achieved in RFID systems involving passive, semi-passive, and/or active RFID tags. Use cases involving any of these types of RFID tags typically include signal transmissions by the RFID reader and detection of responses from one or more RFID tags, thus present similar needs for effective echo cancellation by the RFID reader.

The signal transmissions described in this disclosure may utilize any of various radio frequencies, for example in the low frequency (LF) range (30-500 kilohertz (KHz), or more particularly 125-134 KHz), the high frequency (HF) range (3-30 megahertz (MHz), or more particularly 13.56 MHz), the ultra-high frequency (UHF) range (300-960 MHZ, or more particularly 433 MHZ), and/or microwave frequencies (e.g., 2.45 gigahertz (GHz) or 5.6 GHZ).

Further information regarding RFID systems, including commands, communications, and computing architectures traditionally involved therein, may be found in the specification for RFID air interfaces (GS1 Global. (2015). *EPC™ Radio-Frequency Identity Protocols Generation-2 UHF RFID*. https[colon]//www[dot]gs1[dot]org/sites/default/files/docs/epc/uhfc1g2_2_0_0_standard_20131101[dot]pdf).

In the foregoing specification, specific embodiments/aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations/aspects should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations/aspects.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An echo cancellation assembly comprising:
a transceiver;
a power amplifier;
one or more processors; and
one or more memories communicatively coupled to the one or more processors storing instructions that, when executed by the one or more processors, cause the assembly to:
transmit, by the transceiver, an initial signal at a first power level and a first phase,
measure a second power level and a second phase of a reflected signal,
map the second power level to a bias setting of the power amplifier,
determine, by an echo cancellation algorithm, an error vector signal with a third power level and a third phase that is at least partially out of phase relative to the second phase of the reflected signal, and
drive the power amplifier at the bias setting to amplify the error vector signal and at least partially cancel the reflected signal.

2. The echo cancellation assembly of claim 1, wherein the instructions, when executed by the one or more processors, further cause the assembly to, subsequent to driving the power amplifier at the bias setting:
(a) measure a subsequent power level and a subsequent phase of a subsequent reflected signal;
(b) determine, by the echo cancellation algorithm, a subsequent error vector signal with a subsequent power level and a subsequent phase that is at least partially out of phase with the subsequent phase of the reflected signal;
(c) drive the power amplifier at the bias setting to amplify the subsequent error vector signal and at least partially cancel the subsequent reflected signal; and
(d) iteratively repeat the actions (a), (b), and (c) until a minimum error threshold corresponding to the subsequent error vector signal is satisfied or a timeout threshold is exceeded.

3. The echo cancellation assembly of claim 2, wherein the bias setting of the power amplifier is maintained as a same bias setting throughout each of the actions (a), (b), (c), and (d).

4. The echo cancellation assembly of claim 1, wherein the power amplifier is an auxiliary power amplifier, wherein the assembly further comprises a primary power amplifier and an error vector modulator, and wherein the instructions, when executed by the one or more processors, further cause the assembly to:
determine, by the echo cancellation algorithm, at least one of an in-phase offset signal or a quadrature offset signal; and
cause, by the echo cancellation algorithm, the error vector modulator to output the error vector signal based on one or more of (i) an error reference signal sampled at an output of the primary power amplifier, (ii) the in-phase offset signal, or (iii) the quadrature offset signal.

5. The echo cancellation assembly of claim 1, wherein the instructions, when executed by the one or more processors, further cause the assembly to determine, by the echo cancellation algorithm, the error vector signal by:
determining that the third power level of the error vector signal generates a minimum power level of the reflected signal; and
identifying a convergence of the third power level of the error vector signal with the second power level of the reflected signal based on the minimum power level of the reflected signal.

6. The echo cancellation assembly of claim 1, further comprising a bandpass filter and an estimator, wherein the initial signal includes a pilot tone, the reflected signal includes a reflection of the pilot tone, and the instructions, when executed by the one or more processors, further cause the assembly to:
filter, by the bandpass filter, the reflected signal to detect the pilot tone;
measure, by the estimator, a pilot power level and a pilot period of the pilot tone;
generate, by the estimator, an error input based on the pilot power level and the pilot period; and
determine, by the echo cancellation algorithm, the error vector signal based on the error input.

7. The echo cancellation assembly of claim 6, wherein the estimator generates the error input based on (i) an in-phase signal, (ii) a quadrature signal, or (iii) a combination of the in-phase signal and the quadrature signal.

8. The echo cancellation assembly of claim 1, further comprising:
an antenna module; and
a circulator defining (i) a transmission signal path for the initial signal to reach the antenna module, and (ii) a reception signal path that transmits the reflected signal.

9. A method comprising:
transmitting, by a transceiver, an initial signal at a first power level and a first phase;
measuring a second power level and a second phase of a reflected signal;
mapping the second power level to a bias setting of a power amplifier;
determining, by an echo cancellation algorithm, an error vector signal with a third power level and a third phase that is at least partially out of phase relative to the second phase of the reflected signal; and
driving the power amplifier at the bias setting to amplify the error vector signal and at least partially cancel the reflected signal.

10. The method of claim 9, further comprising, subsequent to driving the power amplifier at the bias setting:
(a) measuring a subsequent power level and a subsequent phase of a subsequent reflected signal;
(b) determining, by the echo cancellation algorithm, a subsequent error vector signal with a subsequent power level and a subsequent phase that is at least partially out of phase with the subsequent phase of the reflected signal;
(c) driving the power amplifier at the bias setting to amplify the subsequent error vector signal and at least partially cancel the subsequent reflected signal; and
(d) iteratively repeating the actions (a), (b), and (c) until a minimum error threshold corresponding to the subsequent error vector signal is satisfied or a timeout threshold is exceeded.

11. The method of claim 10, wherein the bias setting of the power amplifier is maintained as a same bias setting throughout each of the actions (a), (b), (c), and (d).

12. The method of claim 9, wherein the power amplifier is an auxiliary power amplifier, and wherein the method further comprises:
determining, by the echo cancellation algorithm, at least one of an in-phase offset signal or a quadrature offset signal; and causing, by the echo cancellation algorithm, an error vector modulator to output the error vector signal based on one or more of (i) an error reference signal sampled at an output of a primary power amplifier, (ii) the in-phase offset signal, or (iii) the quadrature offset signal.

13. The method of claim 9, further comprising determining, by the echo cancellation algorithm, the error vector signal by:

determining that the third power level of the error vector signal generates a minimum power level of the reflected signal; and identifying a convergence of the third power level of the error vector signal with the second power level of the reflected signal based on the minimum power level of the reflected signal.

14. The method of claim 9, wherein the initial signal includes a pilot tone, the reflected signal includes a reflection of the pilot tone, and the method further comprises:

filtering, by a bandpass filter, the reflected signal to detect the pilot tone;

measuring, by an estimator, a pilot power level and a pilot period of the pilot tone;

generating, by the estimator, an error input based on the pilot power level and the pilot period; and determining, by the echo cancellation algorithm, the error vector signal based on the error input.

15. The method of claim 14, wherein the estimator generates the error input based on (i) an in-phase signal, (ii) a quadrature signal, or (iii) a combination of the in-phase signal and the quadrature signal.

16. The method of claim 9, further comprising defining, via a circulator, (i) a transmission signal path for the initial signal to reach an antenna module, and (ii) a reception signal path that transmits the reflected signal.

* * * * *